United States Patent [19]

Vio et al.

[11] Patent Number: 4,480,067
[45] Date of Patent: Oct. 30, 1984

[54] IMPEDING SEDIMENTATION OF CLAYS IN WATER

[75] Inventors: Lino Vio, Pau; Gilles Meunier, Lescar, both of France

[73] Assignee: Societe Nationale Elf Aquitaine, Paris, France

[21] Appl. No.: 526,050

[22] Filed: Aug. 24, 1983

[30] Foreign Application Priority Data

Dec. 31, 1982 [FR] France ................................. 82 22181

[51] Int. Cl.$^3$ ................................................ C08K 5/16
[52] U.S. Cl. .................................... 524/446; 524/555; 524/547
[58] Field of Search ........................ 524/446, 555, 547

Primary Examiner—Paul R. Michl
Assistant Examiner—Alex H. Walker
Attorney, Agent, or Firm—Burgess, Ryan & Wayne

[57] ABSTRACT

A method for impeding the sedimentation of clays in water by adding a water-soluble compound. This compound is constituted by a polymer bearer of hydroxamic groups attached to a linear hydrocarbon chain. The amount of this adjuvant is small on the order of a few milligrams.

17 Claims, No Drawings

IMPEDING SEDIMENTATION OF CLAYS IN WATER

SUMMARY

This invention concerns itself with a method for impeding the sedimentation of clays in waters that contain them; it is specially applied to the treatment of river water used in industrial circuits, this water containing more or less clay in state of suspension. The invention comprises also a product that serves as additive to water for said purpose of impeding the sedimentation of the clays.

One of the inconveniences encountered in industry when river water is used in manufacturing circuits is that the clay particles, initially present in the water, conglomerate and deposit in the pipelines or receptacles; this results in a clogging that lowers the coefficient of thermal transmission of the walls of the apparatus concerned; at the same time the friction coefficient of said walls increases damaging the hydrodynamic qualities of the apparatus. In the case of narrow passages there is even the risk of a total obstruction. When the clays are themselves harmful for a manufacture, it is required previously to eliminate them by a more or less costly operation; but in the case where only the sedimentation is physically troublesome, as, for instance, in cooling circuits, the clays generally are not totally eliminated, and means are used only for impeding the deposit of said substances. Known already in particular are adjuvants such as methylene bis-naphthalene, sodium sulfonate, that when added to the water make it possible to reduce the sedimentation of the clays that are present. However, a lot still remains to be done in this connection, since the known adjuvants only exert a partial action and all the same allow the precipitation of a large portion of the clays contained in the water.

This invention constitutes a marked improvement on the method of inhibiting the deposit of clays by the use of additives. The invention makes it possible in fact considerably to increase the clay fraction that remains in suspension after standing for several days, this fraction being much greater than with the adjuvants hitherto known. Another advantage brought by the invention is that the new adjuvant used gives good results even with more or less saline waters, specially saltish waters such as those of estuaries. Besides, in the adjuvant according to the invention, there suffice much smaller concentrations than in the case of the usual additives.

The new method according to the invention consists in dissolving in the water to be treated a small amount of a water-soluble polymer bearer of hydroxamic groups attached to a linear carbon chain. These polymers can be represented by the formula

The polyolefinic chain — — —CH$_2$-CH— — — — can be of the polyvinyl, polyacryl, polybutenyl, etc. type, but it can also include patterns of copolymers, for example, acrylic, maleic, vinylic acids, esters, or salts, in particular vinyl, vinyl pyrrolidone, butadiene, styrene, or acrylonitrile acetate.

In the inhibitors of clays sedimentation according to the invention, the hydroxamic group can be partly or entirely replaced by a corresponding thio derivative that is, a group of the type

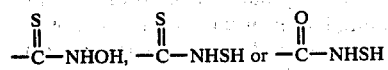

A particularly useful form of the hydroxamic polymers in question is the one where the hydrocarbon chain bears at the same time hydroxamic groups (1) and amide groups

The inhibiting activity of the hydroxamic functions is not disturbed by the presence of amide functions, while the preparation of these mixed hydroxamic and amidic compounds is easy, which represents an undeniable industrial advantage. It is possible, in fact, to manufacture with good yield polymers that bear the two kinds of groups in question (1) and (2) by heating a polyacrylamide with the hydroxylamine.

The sedimentation of clays in a water is best impeded when in the hydroxamic polymer used from 10 to 90% of the active functions are hydroxamic groups (1), the rest being amide groups (2); but the preferred proportions are from 30 to 60% hydroxamic groups and from 70 to 40% amide groups.

Although the invention can be carried out with polymers of different degrees of polymerization, specially from 5 to 200, it is preferable to use agents that are easily soluble in water to which they impart only a slight viscosity, which is obtained with polymerization degrees of from 10 to 100 and mainly from 12 to 70.

When the hydrocarbon chain is of the simple type shown in formulae (1) and (2), the medium molecular masses (in weight) of polymers that can be used, corresponding to the polymerization degrees indicated above, are between 500 and 25,000, preferably between 800 and 5,000 and best from 1,000 to 2,000.

In the polymers described, 1 or 2 hydrogen atoms in the —NHOH group an be replaced by alkylic or arylic radicals, specially alkyls in C$_1$ to C$_6$, by phenyls, or by alkylaryls. It is possible thus to have, for example, polymers of the type

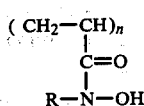

wherein R can be —CH$_3$, —C$_3$H$_7$, —C$_6$H$_{13}$, —C$_6$H$_5$, etc.

Admitting that the effects of hydroxamic polymers on muds, specially drilling muds, are known already (patent application No. 82 16317), it is very surprising that said polymers act in the sense of impeding the sedimentation of clays; it is known in effect that their addition to a drilling mud results in a decrease of the viscosity of the mud; a sedimentation is easier according as the viscosity of the dispersant medium is weak; therefore, it would have been possible to expect that the presence of hydroxamic polymers in a more or less clayey river water led, on the contrary, to a marked sedimentation of the clays. What is observed when hydroxamic polymers are introduced in the water is on the contrary a very marked hindrance of the deposit. The prevailing factor in this case is the non-conglomeration of particles, and therefore the decrease of the sedimentation speed thereof by virtue of the Stokes law.

The examples that follow serve to illustrate the invention without limiting it.

There has been used for these examples distilled water in which a desired amount of clay has been suspended in the following manner. The clay was added to 500 ml water and dispersed by centrifuge for 1 minute; the suspension obtained was preserved in an Erlenmeyer flask; it was homogenized before allowing it to decant for 1 hour. The supernatant liquid is then slowly tapped with a glass rod so as not to raise the clay deposited at the bottom.

For the purpose of analysis, 500 ml of the suspension thus tapped were placed in a 800 ml beaker; the adjuvant to be studied was added and it was homogenized for a few minutes. The beaker, covered with a sheet of aluminum foil, was then placed in a ventilated oven at 65° C. for 45 minutes. The suspension was then poured in a 500 ml test tube and allowed to decant standing for 24 hours or 24 h, 48 h and 72 h. After the desired time, 50 ml were drawn with the point of the syringe on the 200 ml mark of the test tube. The amount of clay in suspension was then determined in a turbidimeter. For this, there are prepared a certain number of dilutions the turbidity of which is measured in Jackson units in the colorimeter HACH DR; the Jackson units are converted to mg of clay per liter. The initial concentration of clay in the suspension is determined by dry matter.

In the examples that use the hydroxamic polymers according to the invention, the latter derive from polyacrylamide and contain still a certain percent of amide groups.

The tables of results indicate in abbreviations:

M: the molecular weight of the polymer used;

hx % rate: the rate % of replacement of the amide groups of the starting polymer by the hydroxamic groups;

PHA mg/l: content of the polymer added to the clayey water;

$A_o$: clay concentration in mg/l in the suspension at the time 0;

$A_{24} A_{48}$ or $A_{72}$: clay concentration in mg/l in the suspension after the time indicated (24 h, 48 h, or 72 h);

$A_{24}/A_o$ %: degree of inhibition of the sedimentation, that is, % of initial clay remaining after the time of duration of the test.

EXAMPLES 1 TO 16

In this series of tests the work has been carried out during 24 h of decantation with different molar weights of the polymer obtained from polyacrylamide; the rates hx of replacement of amidic groups by hydroxamic groups have also been varied; in addition, different concentrations of polymers of the treated water have been tested in Examples 2 to 12.

Examples 13 to 16 give the results obtained with an adjuvant known from the prior art, methylene bisnaphthalene sodium sulfonate, applied to the same clayey water used in Examples 8 to 12. The results have all been set forth in table I. It follows that there can be obtained with the use of the invention a higher degree of inhibition than was known in the prior art: in fact, according to Example 5 it is possible to arrive at maintaining in suspension about 60% of initial clay by dissolving only 1 mg of a hydroxamic polymer per liter of water, while the maximum sedimentation-inhibiting effect with the methylene bis-naphthalene sodium sulfonate does not even reach 20% for 80 mg of adjuvant per liter of water (see Example 16).

Other interesting information can be drawn from table I on the following page.

TABLE I

| | M | Rate hr % | PHA mg/l | $A_o$ | $A_{24}$ | $\frac{A_{24}}{A_o}$ % |
|---|---|---|---|---|---|---|
| 1 | — | — | 0 | 420 | 50 | 11.9 |
| 2 | 40,000 | 27 | 1 | " | 52 | 12.3 |
| 3 | 24,400 | 32 | 1 | " | 65 | 15.5 |
| 4 | 7,500 | 34 | " | " | 175 | 41.6 |
| 5 | 1,500 | 31 | " | " | 250 | 59.5 |
| 6 | 7,500 | 6 | " | " | 80 | 19.0 |
| 7 | 1,500 | " | " | " | 125 | 29.7 |
| 8 | — | — | 0 | 270 | 0 | 0 |
| 9 | 1,500 | 55 | 1 | " | 75 | 27.7 |
| 10 | " | " | 2 | " | 94 | 34.8 |
| 11 | " | " | 10 | " | 66 | 24.4 |
| 12 | " | " | 20 | " | 25 | 9.2 |
| Methylene bis-naphthalene sodium sulfonate mg/l | | | | | | |
| 13 | 1,500 | 55 | 10 | 270 | 21 | 7.8 |
| 14 | " | " | 20 | " | 29 | 10.8 |
| 15 | " | " | 40 | " | 36 | 13.3 |
| 16 | " | " | 80 | " | 52 | 19.2 |

It is seen in fact that for a substantially equal hydroxamic hx % rate, the inhibition degree improves as the molecular weight M of the polymer used is slighter; Examples 2 to 5 show that this result passes from 12.3 to 59.5% while M varies from 40,000 to 1,500. Other tests not indicated on the table lead to an inhibition of 60.5% when M equals 800 with hx=32%. For the same clayey water the comparison of Example 4 with Example 6 indicates the important of the hx: it is in fact observed that passing from hx%=6 to hx=34, $(A_{24}/A_o)$% changes from 19 to 41.6.

An important peculiarlity of the invention is illustrated by Examples 9 to 12 that show that not only is there no interest whatever in increasing too much the concentration of adjuvant in the clayey water but that this concentration must be weak and comprised within certain limits to obtain a maximum effect.

It has thus been established that the concentrations of adjuvant according to the invention must be comprised between 0.5 and 10 mg/l and preferably between 1 and 5 mg/l or between 0.1 and $5 \times 10^{-6}$ macromoles/l.

EXAMPLES 17 TO 20

Tests similar to the preceding ones have been carried out with a water containing in suspension 1,540 mg/l clay ($A_o$). The hydroxamic polymer obtained from polyacrylamide has a molecular weight M=5 100; it is used in a concentration of 1 mg/l, that is, $2 \times 10^{-7}$ macromoles per liter. The decantations and analyses have been made after 24 h, 48 h and 72 h, which respectively leads to the concentrations $A_{24}$, $A_{48}$, $A_{72}$ of table II that follows.

TABLE II

| $M = 5\,100$ | $A_o = 1\,540$ mg/l | | Concen. PHA = 1 mg/l | |
|---|---|---|---|---|
| | No. | | | |
| | 17 | 18 | 19 | 20 |
| Control PHA 0 mg/l | | | | |
| Rate hour % | — | 7 | 20 | 33 |
| $A_{24}$ mg/l | 130 | 160 | 460 | 740 |
| $A_{24}/A_o$ % | 8.4% | 10.4% | 29.8% | 48% |
| $A_{48}$ mg/l | 50 | 85 | 250 | 370 |
| $A_{48}/A_o$ % | 3.2% | 5.5% | 16.2% | 24% |
| $A_{72}$ mg/l | 40 | 50 | 170 | 270 |
| $A_{72}/A_o$ % | 2.6% | 3.2% | 11% | 17.5% |

Example 17 corresponds to the test without any adjuvant: it leads to very low percents of remaining clay. The improvement is not too great in Example 18 because the hydroxamic rate hx is weak, 7%. On the other hand, the results are already interesting in Example 19 where hx=20%: here the inhibition degree of the sedimentation is approximate to 30% after 24 h and it still remains at 11% after 72 h.

Example 20 confirms the results of the preceding table in the sense that an hx above 30 leads to excellent results: there are still 48% of initial clay in the water after 24 h and 17.5% after 72 h, that is, more than remains after 24 h with 40 mg/l of methylene bis-naphthalene sodium sulfonate.

We claim:

1. A method of impeding the sedimentation of clays in a water containing the same, which consists in adding to the water a slight amount of a polymer which bears hydroxamic groups attached to a linear hydrocarbon chain.

2. The method according to claim 1, wherein said hydrocarbon chain is selected from the group consisting of polyolefins, polyvinyl, polyacryl and polybutenyl.

3. Method according to claim 1, wherein sais polymer, which bears hydroxamic groups, is a copolymer of the hydrocarbon chain with acrylic acid, an acrylic ester or a salt of acrylic acid.

4. Method according to claim 1, wherein said polymer, which bears hydroxamic groups, is a copolymer of the hydrocarbon chain with maleic acid, a maleic ester or a salt of maleic acid.

5. Method according to claim 1, wherein said polymer, which bears hydroxamic groups, is a copolymer of the hydrocarbon chain with units selected from the group consisting of vinyl, vinyl pyrrolidone, butadiene, styrene and acrylonitrile.

6. Method according to claim 1, wherein said polymer bears amide groups beside the hydroxamic ones.

7. Method according to claim 6, wherein said polymer is constituted by a chain of polyacrylamide in which 10 to 90% of amide groups are replaced by hydroxamic groups.

8. Method according to claim 1, wherein at least one of the oxygene atoms in the hydroxamic function

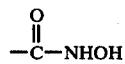

is replaced by a sulfur atom.

9. Method according to claim 7, wherein at least one of the oxygen atoms in the hydroxamic function

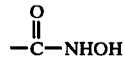

is replaces by a sulfur atom.

10. Method according to claim 7, wherein the molecular mass of the polymer is 500 to 25000.

11. Method according to claim 1, wherein the concentration of the hydroxamic groups bearing polymer is $0.1 \times 10^{-6}$ to $5 \times 10^{-6}$ macromolecules per liter.

12. Method according to claim 1, wherein one or two hydrogen atoms in the —NHOH moiety of the hydroxamic group are substituted with $C_1$ to $C_6$ alkyles, phenyls or alkylaryls.

13. Method according to claim 7, wherein the concentration of the polymer in the water treated is 0.5 to 10 mg per liter.

14. Method according to claim 13, wherein the water to be treated contains about 150 to about 1,540 mg of clay per liter.

15. Method of impeding the sedimentation of clays in a water containing the same, which consists in dissolving, per liter of the water, 0.5 to 10 mg of a copolymer constituted by polyacrylamide in which 10 to 90% of —$CONH_2$ groups are replaced by

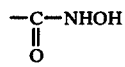

groups, the molecular mass of the copolymer being of 500 to 25000.

16. Method according to claim 15, wherein the amount of said copolymer is 1 to 5 mg per liter, the copolymer being formed by polyacrylamide in which 30 to 60% of —$CONH_2$ groups are replaced

the molecular mass of the copolymer being about 800 to 2000.

17. Method according to claim 16, wherein the water to be treated contains 150 to 1,540 mg of clay per liter.

* * * * *